(12) United States Patent
Chen

(10) Patent No.: US 7,564,681 B2
(45) Date of Patent: Jul. 21, 2009

(54) EXTERNAL HEAT DISSIPATOR DETACHABLY ADAPTED TO A HEAT SOURCE TO FORCE AWAY HEAT GENERATED BY THE HEAT SOURCE

(76) Inventor: Chien-Chang Chen, 4F, No. 123-8, Hsingte Rd., San Chung City, Taipei Hsien (TW)

( * ) Notice: Subject to any disclaimer, the term of this patent is extended or adjusted under 35 U.S.C. 154(b) by 108 days.

(21) Appl. No.: 11/896,796

(22) Filed: Sep. 6, 2007

(65) Prior Publication Data

US 2007/0297133 A1 Dec. 27, 2007

Related U.S. Application Data

(63) Continuation-in-part of application No. 11/471,481, filed on Jun. 21, 2006, now abandoned.

(51) Int. Cl.
*H05K 7/20* (2006.01)
(52) U.S. Cl. .................. 361/679.49; 361/695; 165/80.3
(58) Field of Classification Search ...............................
361/679.51–679.55, 679.46, 679.48, 679.49,
361/695, 699, 700, 703, 704
See application file for complete search history.

(56) References Cited

U.S. PATENT DOCUMENTS

| D268,283 | S | 3/1983 | Hicks |
| 4,383,286 | A | 5/1983 | Hicks |
| D275,787 | S | 10/1984 | Rapp et al. |
| D285,794 | S | 9/1986 | Cladek |
| 5,898,568 | A | 4/1999 | Cheng |
| 6,058,009 | A * | 5/2000 | Hood et al. ............ 361/679.47 |
| 6,104,607 | A * | 8/2000 | Behl ..................... 361/679.49 |
| 6,122,168 | A * | 9/2000 | Cheng ........................ 361/695 |
| 6,236,564 | B1 | 5/2001 | Fan |
| 6,239,970 | B1 | 5/2001 | Nakai et al. |
| 6,459,575 | B1 | 10/2002 | Esterberg |
| 6,563,703 | B2 | 5/2003 | Xie |
| 6,674,640 | B2 * | 1/2004 | Pokharna et al. ....... 361/679.48 |
| 6,894,897 | B1 | 5/2005 | HNagurny et al. |
| 6,954,354 | B2 | 10/2005 | Shyr |
| 2004/0264127 | A1 * | 12/2004 | Chiu .......................... 361/687 |
| 2005/0248919 | A1 * | 11/2005 | Suzuki et al. ............... 361/687 |
| 2006/0285291 | A1 | 12/2006 | Elkins |
| 2007/0041157 | A1 | 2/2007 | Wang |

FOREIGN PATENT DOCUMENTS

DE 297 04971 U1 8/1997
JP 2000304319 A 11/2000

* cited by examiner

*Primary Examiner*—Jayprakash N Gandhi
*Assistant Examiner*—Courtney Smith
(74) *Attorney, Agent, or Firm*—Bacon & Thomas, PLLC

(57) ABSTRACT

An external heat dissipator for a heat generating source having a heat dissipating vent includes a casing adapted to connect to the heat dissipating vent and having an outlet adapted to correspond to and align with the heat generating vent and an inlet communicating with the outlet for allowing air inside the heat generating source to escape therefrom. A fan assembly is securely received in the casing to generate air flow inside the heat generating source for dissipating heat inside the heat generating source. A connection device is provided to engage the casing with the heat dissipating vent of the heat generating source.

6 Claims, 8 Drawing Sheets ure EXTERNAL HEAT DISSIPATOR DETACHABLY ADAPTED TO A HEAT SOURCE TO FORCE AWAY HEAT GENERATED BY THE HEAT SOURCE The present invention is a continuation-in-part application claiming the benefit of U.S. patent application Ser. No. 11/471,481 filed on Jun. 21, 2006.

BACKGROUND OF THE INVENTION

1. Field of the Invention

The present invention relates to an external heat dissipator, and more particularly to an external heat dissipator detachably adapted to a heat source so as to force heat generated by the heat source to flow away from the heat source.

2. Description of the Prior Art

Electronic devices have different built-in heat dissipators to force heat generated during the operation of the electrical components inside the electronic device away from the electronic devices to maintain the electrical components in stable working status. If there is no heat dissipator provided inside the electronic device, the electronic device will crash due to overheat. That is, temperature is an important factor in maintaining the electronic device in stable conditions. However, the heat dissipating volume of the built-in heat dissipator can not catch up with the heat generating speed in that in order to meet with multi-task requirements, the advanced electronic devices are somehow provided with dual, high-speed CPUs (central processing unit) to deal with numerous calculations simultaneously.

The calculation speed of each of the two CPUs is becoming faster and faster than ever before so that the operator is able to quickly acquire the required solutions to carry on the next task. It is good to have solutions in just seconds, but it is a big problem as how to maintain the CPU functions normal. As the temperature inside the electronic devices goes higher and higher, the calculation speed of the two CPUs becomes slower and slower. Eventually the electronic devices crash if there is no protection measurements taken to prevent such an incident. U.S. Pat. No. 5,898,568 provides a heat dissipator trying to dissipate as much heat as possible as the CPU is working and the temperature inside the electronic device is building up. However, the efficiency and affect of the heat dissipator disclosed in the patent seems inequitable.

To overcome the shortcomings, the present invention tends to provide an improved external heat dissipator to mitigate the aforementioned problems.

SUMMARY OF THE INVENTION

The primary objective of the present invention is to provide an external heat dissipator adapted to be detachably connected to a heat generating source so as to force the heat out of a heat generating source.

Other objects, advantages and novel features of the invention will become more apparent from the following detailed description when taken in conjunction with the accompanying drawings.

DETAILED DESCRIPTION OF THE PREFERRED EMBODIMENT

Figure 1A:
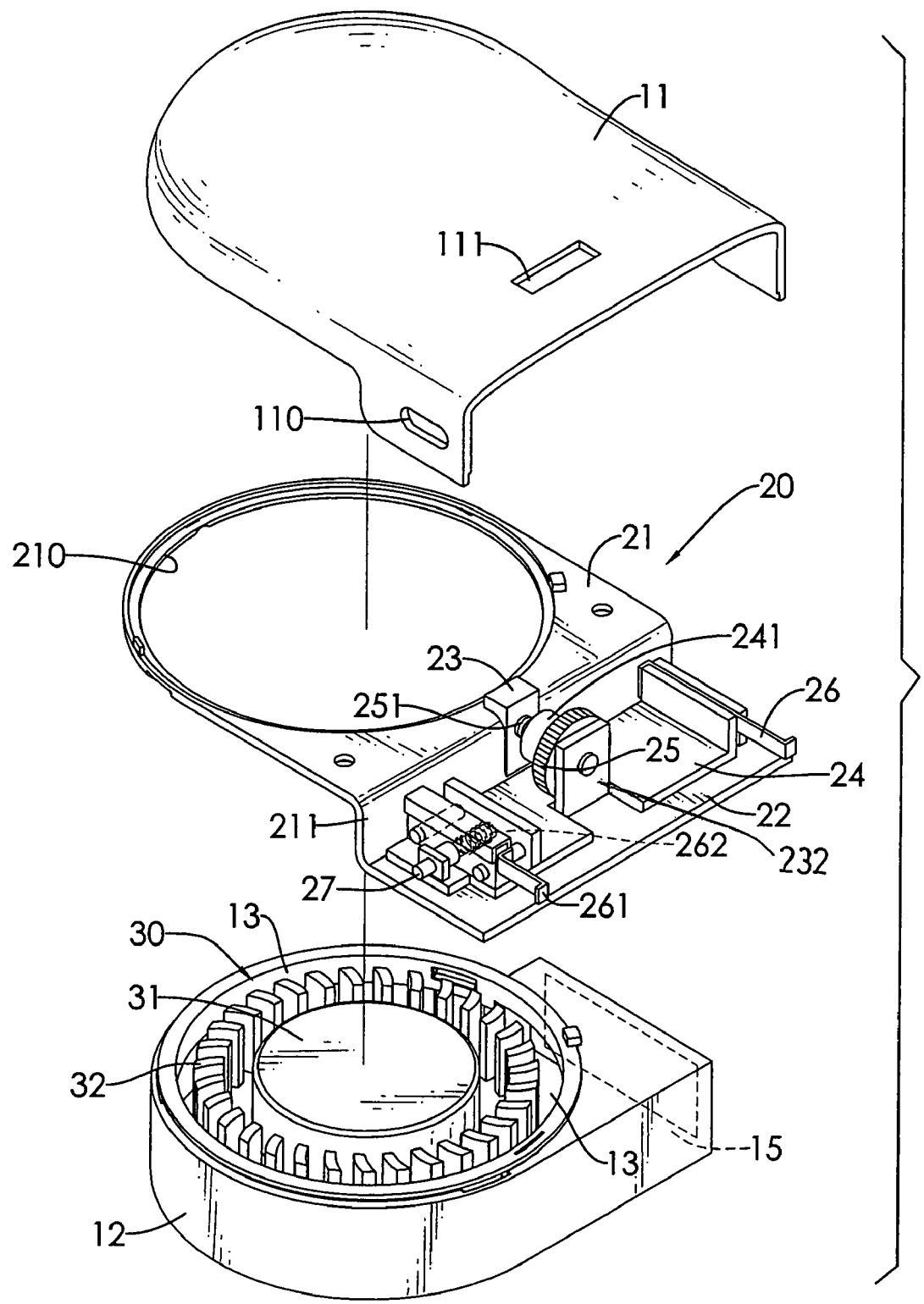
FIG. 1A is an exploded perspective view of the heat dissipator of the present invention.
Figure 1B:
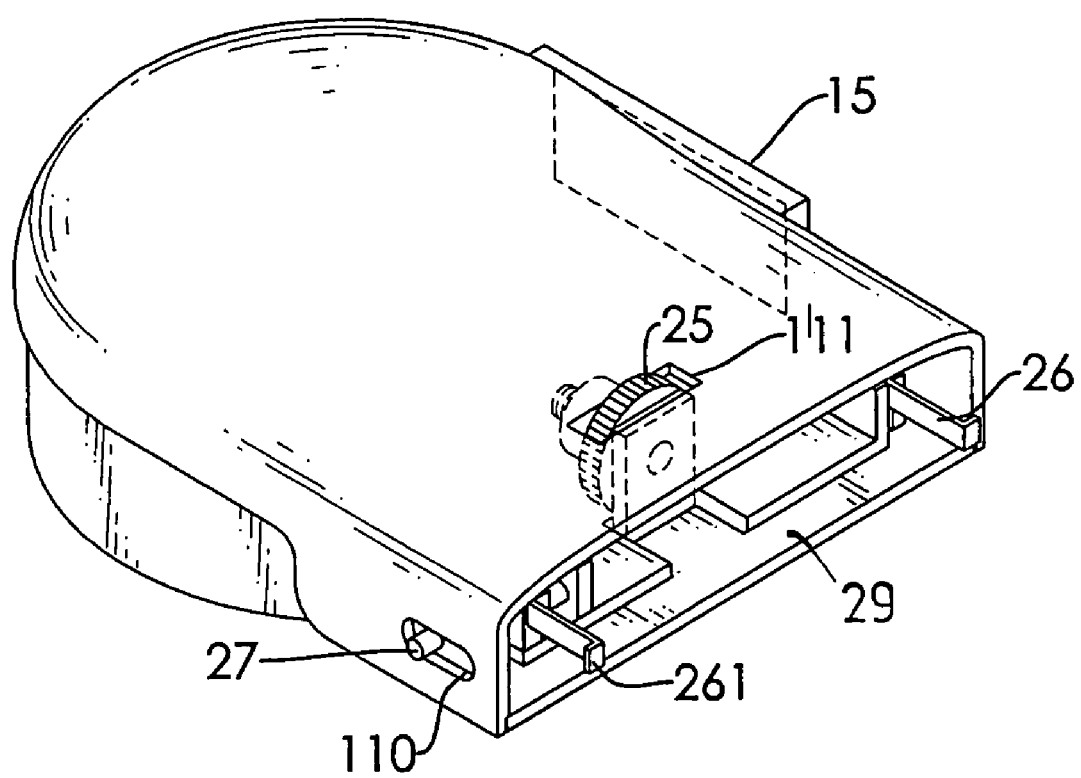
FIG. 1B is a perspective view of the heat dissipator after being assembled.

With reference to FIGS. 1A and 1B, it is noted that the external heat dissipator adapted for connection to a heat generating source, e.g. a laptop, and constructed in accordance with the present invention includes a top casing (11), a bottom casing (12), a connection device (20) and a fan assembly (30) rotatably received between the top casing (11) and the bottom casing (12). The top casing (11) has two side holes (110) defined in two opposite side walls of the top casing (11) and a hole (111) defined through a side face between the two opposite side walls of the top casing (11).

The top casing (11) together with the bottom casing (12) defines therebetween a receiving space (13) to receive therein the fan assembly (30). An inlet (15) is defined through a side face of the bottom casing (12) to communicate with the receiving space (13). It is well known in the art that the fan assembly (30) normally includes a motor (31) and multiple blades (32) operably controlled by the motor (31) such that when the motor (31) is activated, the blades (32) are able to generate air flow between the top casing (11) and the bottom casing (12).

The connection device (20) in this embodiment includes a base (21) provided with a through hole (210) corresponding to the receiving space (13) of the bottom casing (12) and a step (211) adjacent to the through hole (210). Furthermore, the connection device (20) has a ledge (22) extending from a free end of the step (211), mounted between the top casing (11) and the bottom casing (12) to define an outlet (29) between the top casing (11) and the connecting device (20) and communicating with the receiving space (13) and the inlet (15). The connection device (20) has a U-shaped seat, a sliding plate (24), a knob (25), a fixed arm (26), a moving arm (261) and a push (27). The U-shaped seat is formed on the ledge (22) and has a first mount (23), a second mount (232) and a recessed area. The first mount (23) is formed on the base (21) and the ledge (22). The second mount (232) is formed on the ledge (22) opposite to the first mount (23). The recessed area is defined between the first mount (23) and the second mount (232). The sliding plate (24) is movably mounted on top of the ledge (22) and has a sleeve (241) formed on a top face of the sliding plate (24) and situated in the recessed area in the U-shaped seat. The knob (25) is rotatably received in the recessed area of the U-shaped seat and has a threaded rod (251) threadingly extending through the sleeve (241) as well as the knob (25) and situated between the first mount (23) and the second mount (232) of the U-shaped seat. The fixed arm (26) is formed on one side of the ledge (22). The moving arm (261) is movably mounted on a side of the ledge (22) to be opposite to the fixed arm (26). The push (27) is movably connected to a side of the moving arm (261) via a spring (262) such that movement of the push (27) drives the moving arm (261) to move accordingly, wherein the push (27) corresponds to the side hole (110) of the top casing (11). Furthermore, the first mount (23) of the U-shaped seat protrudes up from the base (21) to defined an internal space (231) located between the base (21) and the top casing (11) adjacent to the first mount (23) of the U-shaped seat and communicating with the through hole (210) and the outlet (29). Accordingly, the outlet (29) communicates with the inlet (15) through the internal space (231).

After assembly of the external heat dissipator of the present invention, it is noted that the push (27) is extended out of the side hole (110), the fixed arm (26) as well as the moving arm (261) is extending out of the outlet (29). Further, the knob (250 is extending out of the hole (111) of the top casing (11).

Figure 2:
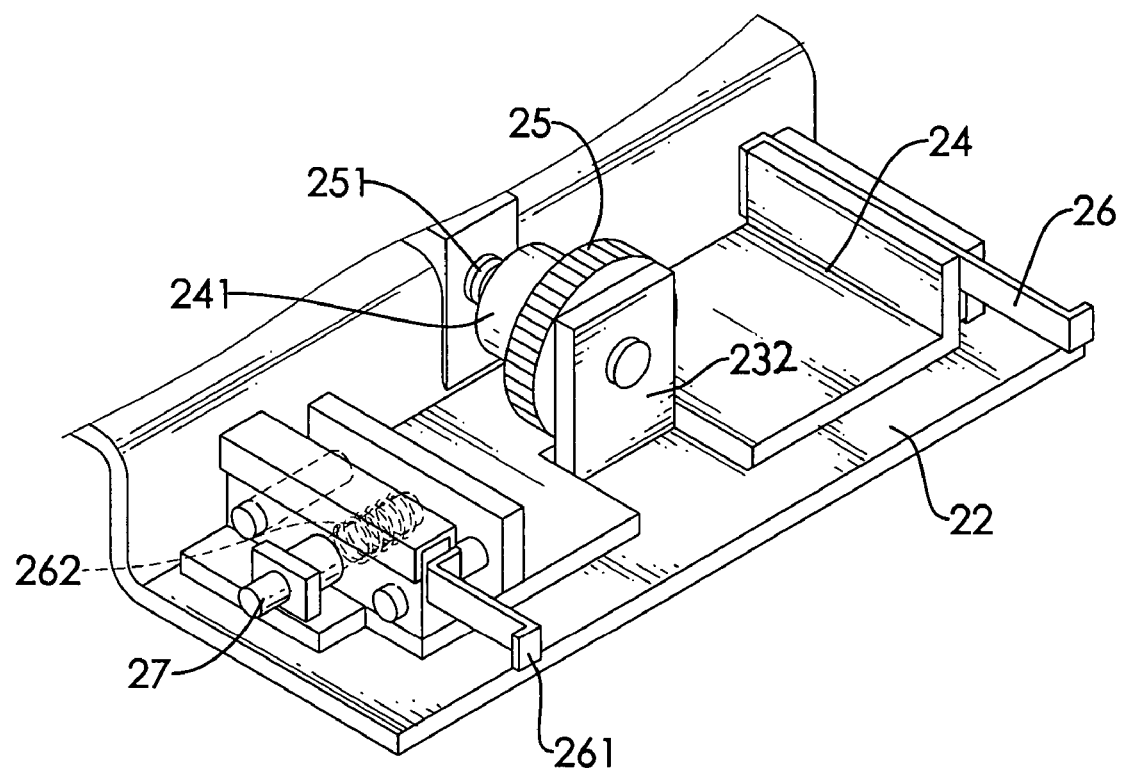
FIG. 2 is a partial perspective view of the heat dissipator of the present invention.
Figure 4:
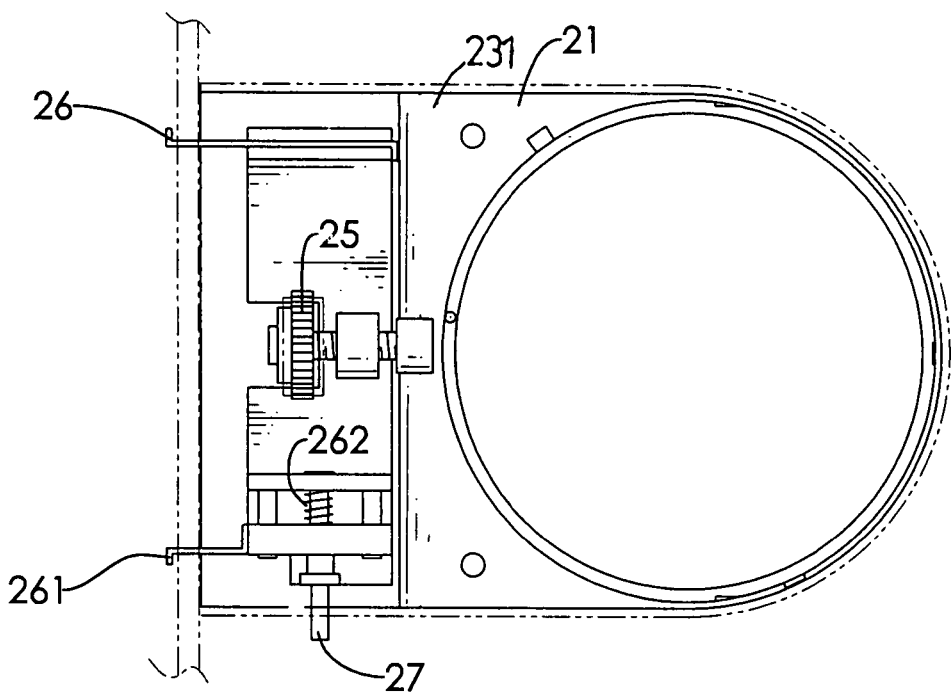
FIG. 4 is a schematic top plan view showing that the heat dissipator is securely connected to the side wall of the heat generating source, wherein the fan assembly and the top and bottom casings are omitted.
Figure 3:
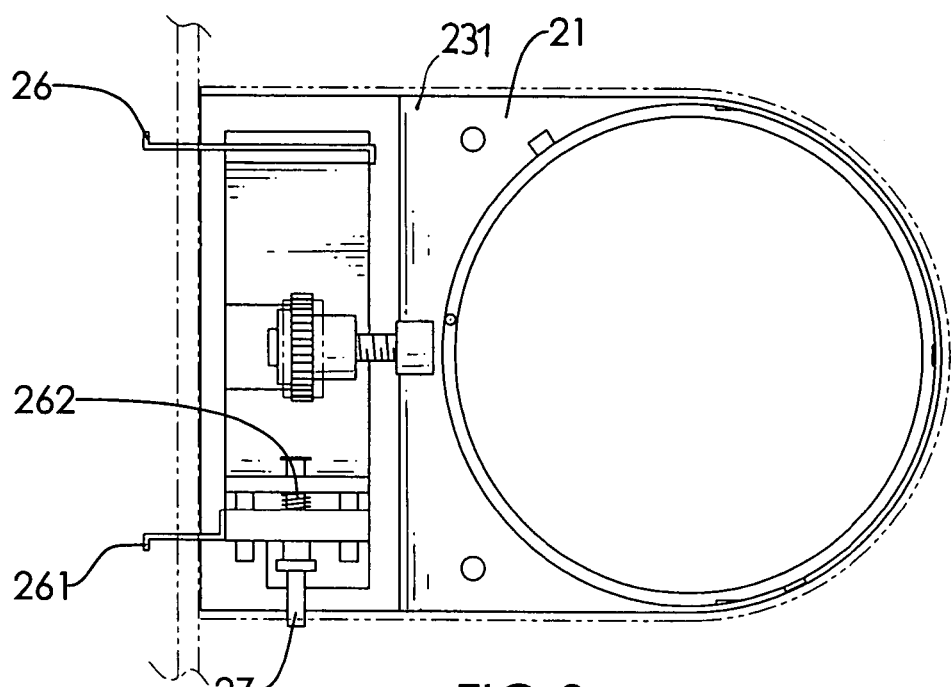
FIG. 3 is a schematic top plan view showing the application of the heat dissipator to a side wall of a heat generating source, wherein the fan assembly and the top and bottom casings are omitted.

With reference to FIGS. 2, 3 and 4, it is noted that the external heat dissipator of the present invention is adapted to connect to a heat dissipating vent defined in a laptop computer and the heat dissipating vent normally is provided with a grill. Therefore, before the activation of the fan assembly (30), the fixed arm (26) is first extended into the heat dissipating vent (not numbered) of the heat source and then the push (27) is pushed inward to drive the moving arm (261) to move toward the fixed arm (26). After the movement of the moving arm (261), the operator is able to select a suitable void in the heat dissipating vent and then extends the moving arm (261) into a corresponding void. When the push (27) is released, the spring (262) provides a recovery force to the push (27) as well as the moving arm (261) so that the moving arm (261) is able to engage with the peripheral edge of the corresponding void. The fixed arm (26) and the moving arm (261) alone are not able to secure the external heat dissipator to the heat source though they engage with peripheries of the heat source. In order to enhance the engagement with the heat source, the operator rotates the knob (25) to drive the sliding plate (24) to move relative to the ledge (22). Because both the fixed arm (26) and the moving arm (261) are securely mounted on the sliding plate (24), the movement of the sliding plate (24) causes the fixed arm (26) and the moving arm (261) to firmly engage with peripheries of the heat dissipating vent of the heat source (shown in dashed lines). As such, the operation of the fan assembly (30) is able to generate air flow inside the heat source to dissipate the heat inside the heat source.

Figure 5:
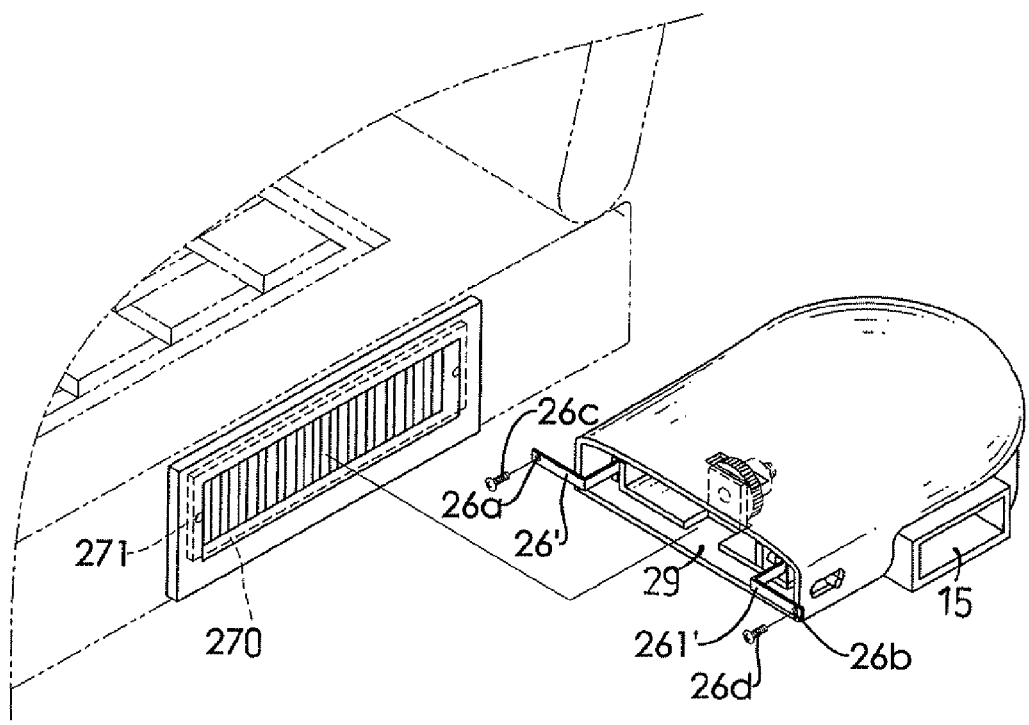
FIG. 5 is a schematic perspective view of a second embodiment of the connection device of the present invention.
Figure 6:
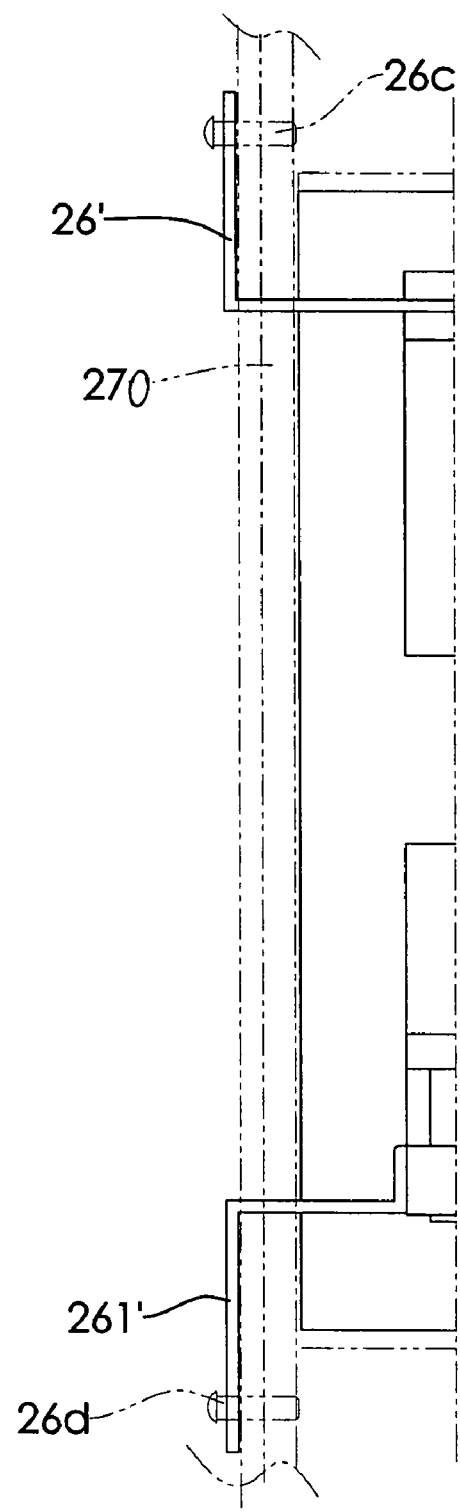
FIG. 6 is a partially schematic side plan view showing the adaptation of the second embodiment of the connection device of the present invention.

With reference to FIGS. 5 and 6, it is noted that the connection device (20) in this embodiment now includes a fixed arm (26') and a moving arm (261'). The structure causing the moving arm (261) to move relative to the fixed arm (26) is the same as that disclosed in the first embodiment. Therefore, detailed description as to how the moving arm (261) is moving relative to the fixed arm (26) is omitted to avoid repetition. Each of the fixed arm (26') and the moving arm (261') is provided with a securing hole (26a, 26b) and a securing bolt (26c, 26d). The connection device (20) further has a securing plate (270) adapted to be situated behind the heat dissipating vent and having two connection holes (271) corresponding to and aligned with the two securing holes (26a, 26b). Thus, when the external heat dissipator is connected to the heat source, the two securing bolts (26c, 26d) are threadingly extended into the two securing holes (26a, 26b) and the two connection holes (271) of the securing plate (270) to securely connect the external heat dissipator to the heat generating source.

Figure 7:
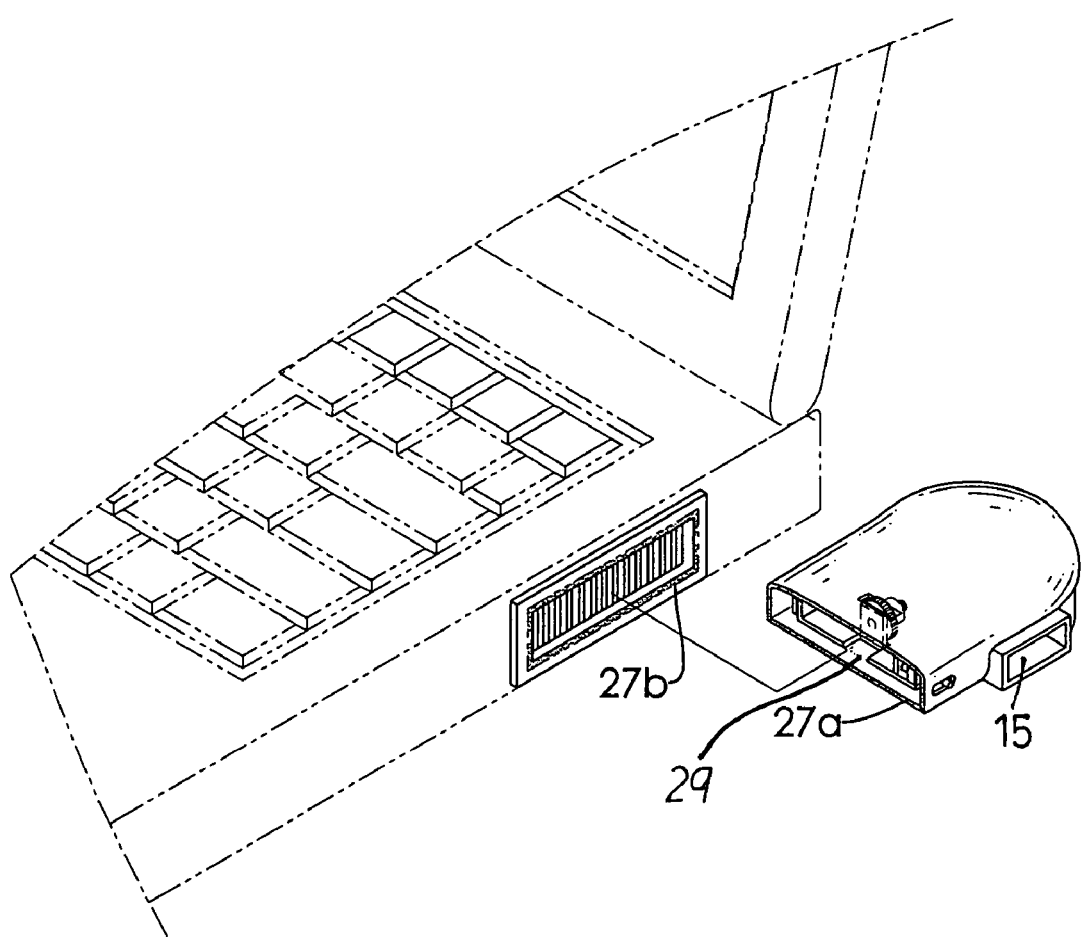
FIG. 7 is a schematic perspective view of the third embodiment of the connection device of the present invention.

FIG. 7 shows that a male adhesive (27a) and a female adhesive (27b) are respectively provided to a periphery of the outlet (29) of the external heat dissipator of the present invention and a periphery of the heat dissipating vent so that after the male adhesive (27a) and the female adhesive (27b) are connected with each other, the external heat dissipator is securely adapted to connect to the heat generating source.

Figure 8:
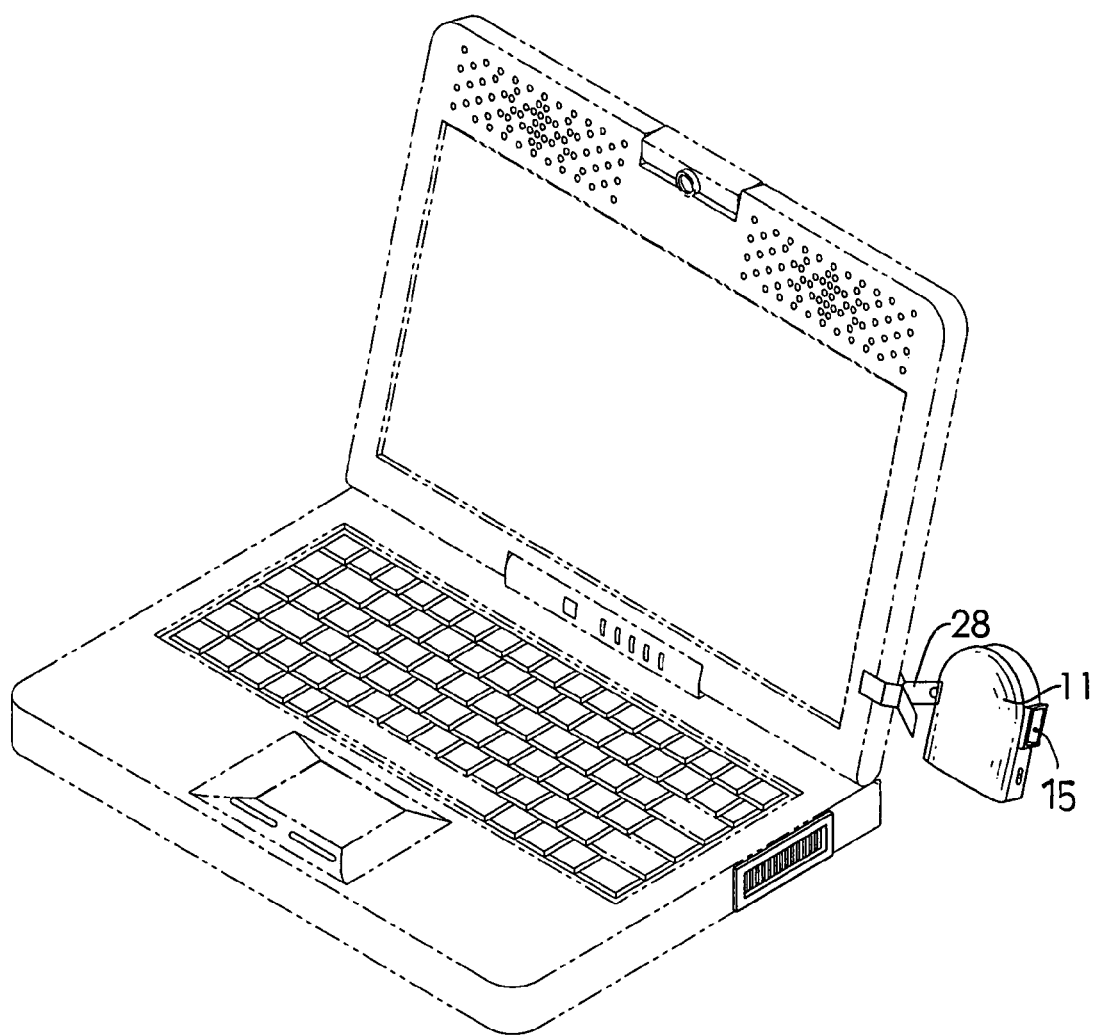
FIG. 8 is a schematic perspective view of the fourth embodiment of the connection device of the present invention.

FIG. 8 shows that the connection device of the external heat dissipator of the present invention is a clamp (28) adapted to clamp a periphery of the heat generating source and pivotally connected to a periphery of the top casing (11) such that the external heat generator is able to dissipate heat from the heat generating source after being pivoted to allow the outlet (29) to communicate with the heat dissipating vent of the heat generating source.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An external heat dissipator for a heat generating source having a heat dissipating vent, the external heat dissipator comprising:
    a casing adapted to connect to the heat dissipating vent and having an inlet communicating with the outlet for allowing air inside the heat generating source to escape therefrom;
    a fan assembly securely received in the casing to generate air flow inside the heat generating source for dissipating heat inside the heat generating source; and
    a connection device provided to engage the casing with the heat dissipating vent of the heat generating source, mounted in the casing to define an outlet communicating with the inlet and including
        a sliding plate being movable relative to the casing; and
        two arms mounted securely on the sliding plate and extending out of the outlet of the casing to be adapted to securely engage a periphery of the heat dissipating vent.

2. The external heat dissipator as claimed in claim 1 further comprising a base firmly received in the casing and provided with a step and a ledge extending from a free end of the step, the sliding plate being movably mounted on top of the ledge so as to allow the two arms for secured engagement with the periphery of the heat dissipating vent.

3. The external heat dissipator as claimed in claim 2, wherein the base has a U-shaped seat and the ledge has a sleeve integrally formed with the ledge and situated in a recessed area in the U-shaped seat, a threaded rod is rotatably extending through the sleeve and between a first mount and a second mount of the U-shaped seat and a knob is securely mounted on the threaded rod so that rotation of the knob drives the sleeve as well as the sliding plate to move relative to the base and the two arms are able to securely engage with the periphery of the heat dissipating vent.

4. The external heat dissipator as claimed in claim 3, wherein one of the two arms is fixedly mounted on the ledge and the other arm is movable relative to the ledge so that the two arms are able to adapt to the heat dissipating vent.

5. The external heat dissipator as claimed in claim 4, wherein one of the arms is provided with a push engaged with the arm via a spring and extending out of the casing from a side hole which is defined in a side of the casing.

6. The external heat dissipator as claimed in claim 1, wherein the securing plate is adapted to be situated behind the heat dissipating vent and has two connection holes respectively corresponding to and aligning with two securing holes each defined in a corresponding one of the two arms so as to allow two securing bolts to extend into the aligned securing holes and the connection holes to secure engagement between the outlet of the casing and the heat dissipating vent.

* * * * *